A. E. WESTBURG.
GAS REGULATOR.
APPLICATION FILED MAY 26, 1909.
973,396.
Patented Oct. 18, 1910.
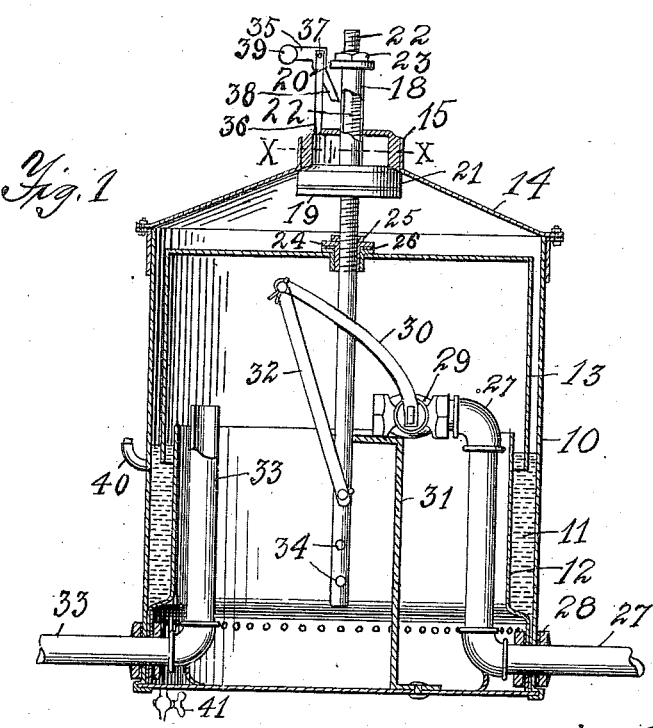
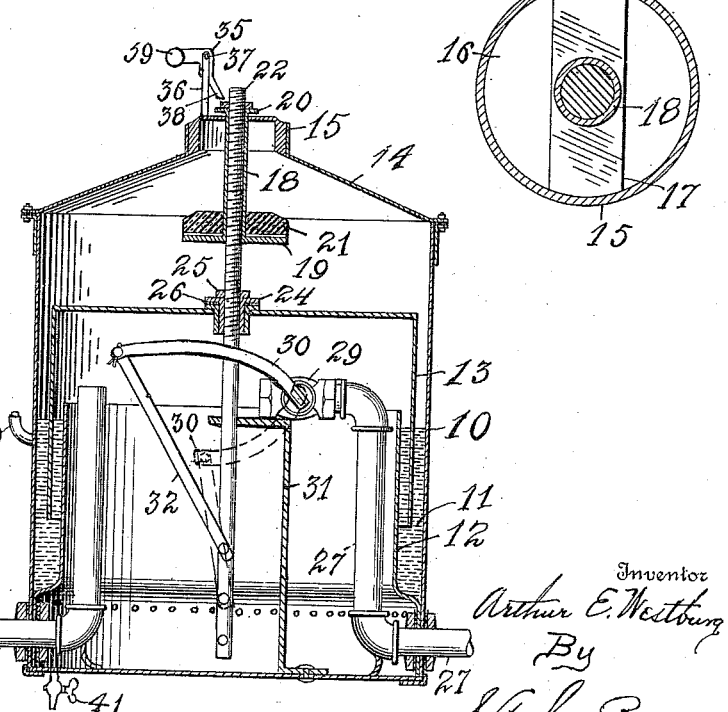

UNITED STATES PATENT OFFICE.

ARTHUR E. WESTBURG, OF JAMESTOWN, NEW YORK.

GAS-REGULATOR.

973,396.  Specification of Letters Patent.  Patented Oct. 18, 1910.

Application filed May 26, 1909. Serial No. 498,476.

*To all whom it may concern:*

Be it known that I, ARTHUR E. WESTBURG, a citizen of the United States, residing at Jamestown, in the county of Chautauqua and State of New York, have invented new and useful Improvements in Gas-Regulators, of which the following, taken in connection with the accompanying drawings, is a full, clear, and exact description.

The invention relates to devices for automatically regulating the flow of gas for fuel or other purposes; and the object of the present invention is to provide a simple automatic regulator for the valve on the end of the gas main, which the pressure of the gas will quickly and easily operate; and the invention consists in the arrangement of the parts as shown in this specification and the accompanying drawings and pointed out in the claims.

In the drawings, Figure 1 is a vertical sectional view of the gas regulator with the valve in the closed or cut off position. Fig. 2 is a similar sectional view with the valve in a partly open position. Fig. 3 is a sectional view at line X X in Fig. 1.

Similar numerals refer to corresponding parts of the several views.

The numeral 10 indicates the outer casing, which is preferably made in the form of a cylindrical receptacle, having therein a similar shaped cylindrical partition 12, which extends up a certain distance within said receptacle and is attached at its lower end to casing 10 so as to provide a space 11 around the inner side of casing 10 wherein liquid may be placed as a seal for the lower edge of the cylindrical dome 13, the dome 13 being inverted within the receptacle 10.

The receptacle 10 is provided with a cover 14 upon which is a cylindrical rim 15 around the top of the same to provide an opening 16 therein. Opening 16 is crossed by a bar 17, which supports centrally within rim 15 the tubular ferrule 18. Ferrule 18 has a flange 19 on its lower end and a flange 20 on its upper end. Flange 19 is made of sufficient width to support thereon a washer 21 which is made preferably of rubber or other suitable material to form a seal to close the opening 16 by being pressed against the under side of top 14 around said opening, as shown in Fig. 1, thereby forming an air tight closure of said opening which prevents the liquid packing in space 11 from being blown out by high pressure.

Ferrule 18 is threaded on its inner surface to receive the threaded upper end of the rod 22 therein, so that ferrule 18 may be adjusted at any desired position upon said rod, and fixed in said position by means of set nut 23. Dome 13 is supported on rod 22 by means of suitably flanged ferrules 24 and set nut 25, so that suitable packing 26 may be placed therebetween to make the joint gas or air tight. The dome 13 is supported at any desired distance below seal 21 and ferrule 18 so as to adjust the pressure of said seal against the under side of top 14.

Rod 22 extends down through dome 13 within receptacle 10. The inlet pipe 27 is inserted through receptacle 10, the joint being sealed with suitable packing as at 28, and extends up within the central portion of the receptacle to about the height of the liquid seal partition 12, in other words, a little above the level of the liquid within the space 11. To the end of pipe 27 is attached an inlet valve 29 which has an arm 30 extending therefrom and firmly fixed thereto so as to operate said valve. The valvular end is preferably supported by an angle piece 31, which also extends out around rod 22 so as to support and guide the lower end of the rod. The outer end of arm 30 is pivotally attached to a link 32, whose lower end is pivotally and adjustably attached to rod 22.

Arm 30 may be adjusted by link 32 to any one of the holes 34 in the lower end of rod 22 so that arm 30 will either entirely close valve 29 or partially close said valve according as it may be desired. It is preferred to control the action of the valve 29 by this positive attachment to rod 22 rather than to depend entirely upon the adjustment of ferrule 18 and rubber washer 21. The opening 16 is necessary in order to admit the atmospheric pressure over dome 13 as it moves up and down, but it is found that with exceeding high pressures which often come in the use of natural gas there is danger of blowing out the liquid from space 11 as hereinbefore stated and the seal 21 absolutely prevents any danger of this kind. An exit pipe 33 is provided the end of which extends up within receptacle 10 to a point above said liquid seal.

A pipe 40 is inserted through the side of the casing 10 and turned upwardly so that the liquid can be poured therein and when filled will be at the desired sealing line within the space 11. An escape valve 41 is provided in the bottom of receptacle 10 for emptying the same.

A locking finger 35 is pivotally mounted at 37 on the upper end of a standard 36 on cross bar 17, which finger 35 has the weight 39 on its outer end so that the inner point 38 of said finger will be constantly pressed against the side of ferrule 18 as it extends at a downward angle from standard 36. It is apparent that as the flange 20 and nut 23 pass downward, they will press finger 38 outward until the flange or nut passes said finger when it will lock the dome and rod in the lower position. This is particularly useful in controlling the regulator when the arm 30 is so placed in its relation to valve 29 that the lower position will give a positive cut off to said valve, thereby not allowing the flow of the gas to come on again by leakage through valve 29 or other cause after the gas supply has been cut off. When it is not desired to so lock the dome and valve mechanism a prop may be placed under weight 39, thereby propping up said weight and withdrawing the inner point 38 of finger 35 from contact with the ferrule 18.

The operation of the gas regulator is as follows: The gas enters the regulator through an inlet pipe 27 and flows out through exit pipe 33. Should the pressure within dome 13 be sufficient to raise said dome, thereby raising arm 30 by means of link 32 attached to rod 22, upon which said dome is firmly attached, then, as shown in Fig. 1 the valve 29 would be closed, stopping the inflow of the gas. As soon as the use of the gas causes the outflow of gas to lower dome 13, as shown in Fig. 2, the lowering of said dome automatically opens valve 29 by drawing down upon arm 30. Simultaneously with the drawing down of dome 13, the seal 21 for opening 16 in the top of the dome, will be removed and said opening will allow the inflow of the air around the top of said dome, but when the valve 29 is closed by the upwardly pressed dome 13, the seal 21 is pressed against the lower side of top 14, closing opening 16, thereby providing a resilient stop for said dome in its upward progress at any desired point, so that by providing a number of holes 34 in the lower end of rod 22 for the bolt or point of attachment for the lower end of link 32 to said rod, the valve may be opened or closed to any desired degree, thereby automatically giving just the control desired for said valve. The adjustment of ferrule 10 as hereinbefore described, aids in this control of the movement of said valve.

I claim as new:

1. In a device of the character described, a receptacle having an opening in the top thereof, a dome inverted within said receptacle having a liquid seal for the lower edge, ingress and egress pipes beneath said dome, a seal attached to the top of said dome to close said opening under high pressure, a guide for said seal, a valve on the ingress pipe, and means for attaching said valve to said dome to control said valve by the upward and downward movement of said dome.

2. In a device of the character described, a receptacle having an opening in the top thereof, a dome inverted within said receptacle having a liquid seal for its lower edge, ingress and egress pipes extending into said receptacle beneath said dome, a rod attached to said dome and extending above and beneath the same, a ferrule adjustably placed on said rod, said ferrule having a projecting flange on its lower end, a seal on said ferrule flange for said opening in the top of said receptacle, substantially as and for the purpose specified.

3. In a device of the character described, a receptacle having an opening in the top thereof, a dome inverted within said receptacle having a liquid seal for its lower edge, ingress and egress pipes extending into said receptacle beneath said dome, a rod attached to said dome and extending above and beneath the same, a ferrule adjustably placed on said rod, a seal on said ferrule for said opening in the top of said receptacle, a valve on said ingress pipes, said valve having an arm and link attachment to said rod to open and close said valve by the movement of said dome.

4. In a device of the character described, a receptacle having an opening in the top thereof, a dome inverted within said receptacle having a liquid seal for its lower edge, ingress and egress pipes extending into said receptacle beneath said dome, a rod attached to said dome and extending above and beneath the same, a ferrule adjustably placed on said rod, a seal on said ferrule for said opening in the top of said receptacle, a valve on said ingress pipes, said valve having an arm and link attachment to said rod to open and close said valve by the movement of said dome, and a latch to automatically lock said dome.

5. In a device of the character described, a cylindrical receptacle 10 having a cover 14 with an opening 16 therein, a cylindrical partition 12 within said receptacle to form a liquid seal, a dome 13 inverted within said receptacle with its lower edge in said liquid seal, a rod 22 attached to said dome and extending above and within the same, a ferrule 18 adjustably mounted on the upper end of said rod, a seal 21 on said ferrule for said opening in said cover, an inlet pipe 27 and an outlet pipe 33 for said receptacle beneath said dome, a valve 29 on said inlet pipe having an arm 30 to open and close the same, and link connection between said arm and said rod to control said valve by the movement of said dome, substantially as and for the purpose specified.

In testimony whereof I have signed my name to this specification in the presence of two subscribing witnesses.

ARTHUR E. WESTBURG.

Witnesses:
  OSCAR L. SMEDBERG,
  A. W. KETTLE.